United States Patent
Taylor et al.

(10) Patent No.: US 10,509,657 B2
(45) Date of Patent: Dec. 17, 2019

(54) FORCED DEVICE REINITIALIZATION WITHOUT MANDATORY RESTART

(71) Applicants: Jeremy Cyle Taylor, Cumming, GA (US); Mustafa Abdulelah, Atlanta, GA (US); Nicholas Caine, Cumming, GA (US); Andrew Klenzak, Atlanta, GA (US); Brian Patrick Rogers, Roswell, GA (US); Sergio Silva, Atlanta, GA (US); Andrew John Wurfel, Smyrna, GA (US)

(72) Inventors: Jeremy Cyle Taylor, Cumming, GA (US); Mustafa Abdulelah, Atlanta, GA (US); Nicholas Caine, Cumming, GA (US); Andrew Klenzak, Atlanta, GA (US); Brian Patrick Rogers, Roswell, GA (US); Sergio Silva, Atlanta, GA (US); Andrew John Wurfel, Smyrna, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 15/964,224

(22) Filed: Apr. 27, 2018

(65) Prior Publication Data
US 2019/0332394 A1 Oct. 31, 2019

(51) Int. Cl.
| | |
|---|---|
| G06F 11/07 | (2006.01) |
| G06F 9/44 | (2018.01) |
| G06F 9/4401 | (2018.01) |
| G06F 13/38 | (2006.01) |
| G06F 9/445 | (2018.01) |

(52) U.S. Cl.
CPC ........ G06F 9/4411 (2013.01); G06F 9/44505 (2013.01); G06F 11/0703 (2013.01); G06F 13/385 (2013.01)

(58) Field of Classification Search
CPC .............. G06F 9/4411; G06F 9/44505; G06F 11/0703; G06F 13/385
USPC ...................................................... 710/104
See application file for complete search history.

(56) References Cited

U.S. PATENT DOCUMENTS

| | | | | |
|---|---|---|---|---|
| 6,266,162 B1* | 7/2001 | Okamura | ........... | H04N 1/00204 358/442 |
| 6,693,717 B1* | 2/2004 | Teradaira | ............... | G06K 15/00 358/1.13 |
| 2011/0113162 A1* | 5/2011 | Miyasaka | ........... | G06F 13/4022 710/11 |

(Continued)

*Primary Examiner* — Christopher B Shin
(74) *Attorney, Agent, or Firm* — Schwegman, Lundberg & Woessner

(57) ABSTRACT

Various embodiments herein each include at least one of systems, devices, methods, and software for forced device reinitialization without mandatory restart. One method embodiment includes receiving, by a first device, a first data communication and responding, by the first device, to the first data communication with a second data communication identifying a state of the first device as a reset state. This embodiment further includes receiving, by the first device in response to the second data communication, a third data communication including data to alter the state of the first device from the reset state to a programmed state. Such embodiments may then implement the data of the third data communication to place the first device in the programmed state.

20 Claims, 3 Drawing Sheets

(56) References Cited

U.S. PATENT DOCUMENTS

2013/0077116 A1* 3/2013 Toshima ............... G06F 3/1204
358/1.13

* cited by examiner

FORCED DEVICE REINITIALIZATION WITHOUT MANDATORY RESTART

BACKGROUND INFORMATION

Before the advent of plug and play, systems would initialize devices once during startup. At this point the device is assumed stable and there is no mechanism to convey the need for reconfiguration if the device requires it, such as following a device reset or a device fault. If a device did require reconfiguration the entire system would need to be restarted to do so. With plug and play, systems can detect device hot plug events and initialize the device is added to the system. Unexpected device resets trigger a re-enumeration and at that point they can be reinitialized without significant impact to the overall system function. The host in such systems operate to identify the hot plug events. However, serial devices are still used in some contexts and device hosts to which these devices couple and the devices themselves do not support hot plug events and still require entire system resets, host and device, to come back online.

SUMMARY

Various embodiments herein each include at least one of systems, devices, methods, and software for forced device reinitialization without mandatory restart. Such embodiments are applicable to devices that are not supportive of plug and play or other hot pluggable enabled services. As such, some embodiments are relevant to serial devices, such as universal asynchronous receiver-transmitter-type devices, among others.

One method embodiment includes receiving, by a first device, a first data communication and responding, by the first device, to the first data communication with a second data communication identifying a state of the first device as a reset state. This embodiment further includes receiving, by the first device in response to the second data communication, a third data communication including data to alter the state of the first device from the reset state to a programmed state. Such embodiments may then implement the data of the third data communication to place the first device in the programmed state.

Another method embodiment includes responding, by a first device, to a first data communication with a second data communication identifying a current state of the first device. The first device of this method may then receive, in response to the second data communication, a third data communication including data to alter the state of the first device from the current state to a new programmed state. Subsequently, the first device continues by implementing the data of the third data communication to place the first device in the new programmed state.

A further embodiment is in the form of a couplable device. The couplable device includes an output device, a data communication device, a processor, and a memory. The memory stores instructions executable by the process to perform data processing activities. The data processing activities may include responding, via the data communication device, to a first data communication received via the data communication device with a second data communication identifying a current state of the couplable device. The data processing activities may also include receiving, via the data communication device in response to the second data communication, a third data communication including data to alter the state of the couplable device from the current state to a new programmed state. The data processing activities may further include implementing the data of the third data communication to place the couplable device in the new programmed state.

DETAILED DESCRIPTION

Figure 1:
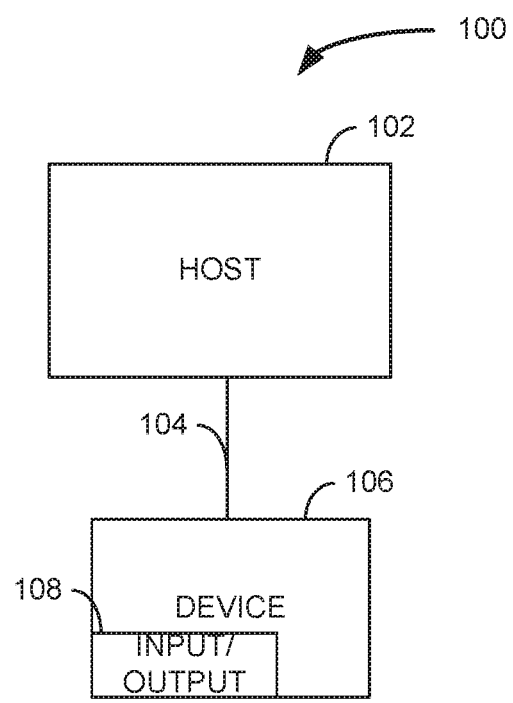
FIG. 1 is a logical block diagram of a system, according to an example embodiment.

Various embodiments herein each include at least one of systems, devices, methods, and software for forced device reinitialization without mandatory restart. Such embodiments are applicable to devices that are not supportive of plug and play or other hot pluggable enabled services. As such, some embodiments are relevant to serial devices, such as universal asynchronous receiver-transmitter-type devices, among others.

In some embodiments, a device can implement a communication policy by which it can force the delivery of state change information to a host system. This allows the host to react to those changes. Consider a scenario where an unexpected device reset has occurred. With this policy, the host in some embodiments is notified of the reset and can reconfigure the device. This notice may occur when the host first attempts to communicate with the device following the device reset or occurrence of a fault condition. Simply, when an important device state change occurs, the device may respond to all incoming host requests with a special message indicating that the state information of the device must be read before further processing can occur. However, the device typically either does not have a copy of the correct state information or when it does have the proper state information, it is but one set of state information of a plurality of sets. As such, the host needs to send the state information to the device or inform the device which set of state information to utilize. Once the device reads the proper state information, the device will return to regular function.

Through the use of the communication policy of such embodiments, devices can accomplish a similar functional effect without the need for any supporting hardware. A simple communication strategy is employed to force the delivery of the state information to a host. When an important device state change occurs, the device responds to all incoming host requests with a special message indicating that it's state information must be queried before further processing can occur. Once the state information has been read, the device will begin servicing all other requests.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical block diagram of a system 100, according to an example embodiment. The system 100 includes, among other things, a host 102 that is coupled to a device 106 via a connection 104. The host 102 may be a controller, such as a microcontroller or other device of the larger system 100, such as a serial device host that communicates asynchronously with the device 106. The device 106 may be a serial device, such as universal asynchronous receiver-transmitter (UART) device and the like. In some embodiments, the device 106 is but one or two or more such devices coupled to the host 102.

The connection 104 between the host 102 and the device 106 may be a wired or wireless connection in various embodiments. The wireless connection may be radio-based or infrared in differing embodiments.

In some embodiments, the device 106 may be one or more of a line display, a multi-line display, a scale, a printer, a pointing device, or other input and output devices 108. Regardless, each of these devices 106 generally includes a microcontroller and a memory that stores instructions to implement at least a default process to inform the host 102 when the device 106 has not been initialized or has encountered a fault or other condition that requires the device 106 to be reinitialized. However, the device 106 generally doesn't have information regarding how to initialize itself to enable the device 106 to communicate with the host. Thus, when the device 106 is in such a state, upon receipt of a request from the host 102, the device 106 responds to the request with a message requesting the host 102 provide initialization data, The initialization data may specify a protocol for use in communicating. This may be actual instructions or codes to use or may instead be a reference to instructions or codes for used that are already stored on the device 106. After implementing the initialization data, the device 106 then proceeds to respond to subsequent host 102 requests accordingly.

Figure 2:
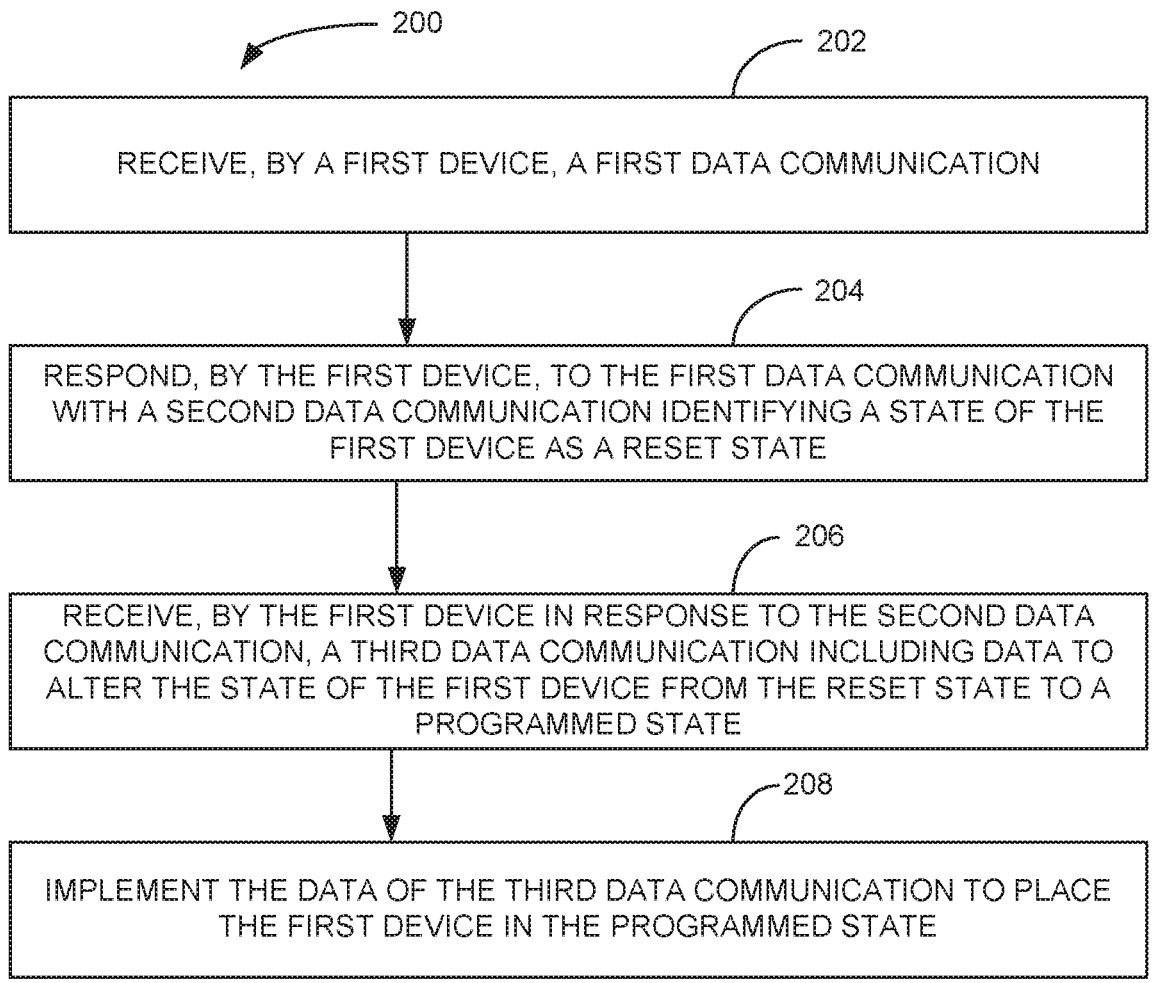
FIG. 2 is a block flow diagram of a method, according to an example embodiment.

FIG. 2 is a block flow diagram of a method 200, according to an example embodiment. The method 200 is an example of a method that may be performed by the device 106 of FIG. 1.

The method 200 includes receiving 202, by a first device, a first data communication and responding 204, by the first device, to the first data communication with a second data communication identifying a state of the first device as a reset state. This response 204 occurs of course only when the first device is in a reset state or a fault state, or some other such state for which the device should be reinitialized to proceed, in some additional embodiments.

The method 200 further includes receiving 206, by the first device in response to the second data communication, a third data communication including data to alter the state of the first device from the reset state to a programmed state. The method 200 then implements 208 the data of the third data communication to place the first device in the programmed state.

In a further embodiment, the method 200 also includes receiving, by the first device, a fourth data communication including a request and performing data processing to fulfill the request. in some such embodiments, the first device is a printer and the request of the fourth communication is a request to print a document. In such embodiments, the data processing performed to fulfill the request includes instructing the printer to print the document.

In some embodiments of the method 200, the first device includes a microcontroller that defaults to the reset state when the first device is reset, the reset state causing the first device to respond to any communication with response of the second data communication identifying the state of the first device as the reset state.

In some of these and other embodiments, data communications are received by he first device from a host device to which the first device is communicatively coupled. The communicative coupling of the first device to the host in some embodiments is a physical coupling, such as by a wire or a socket holding a card of the device.

Figure 3:
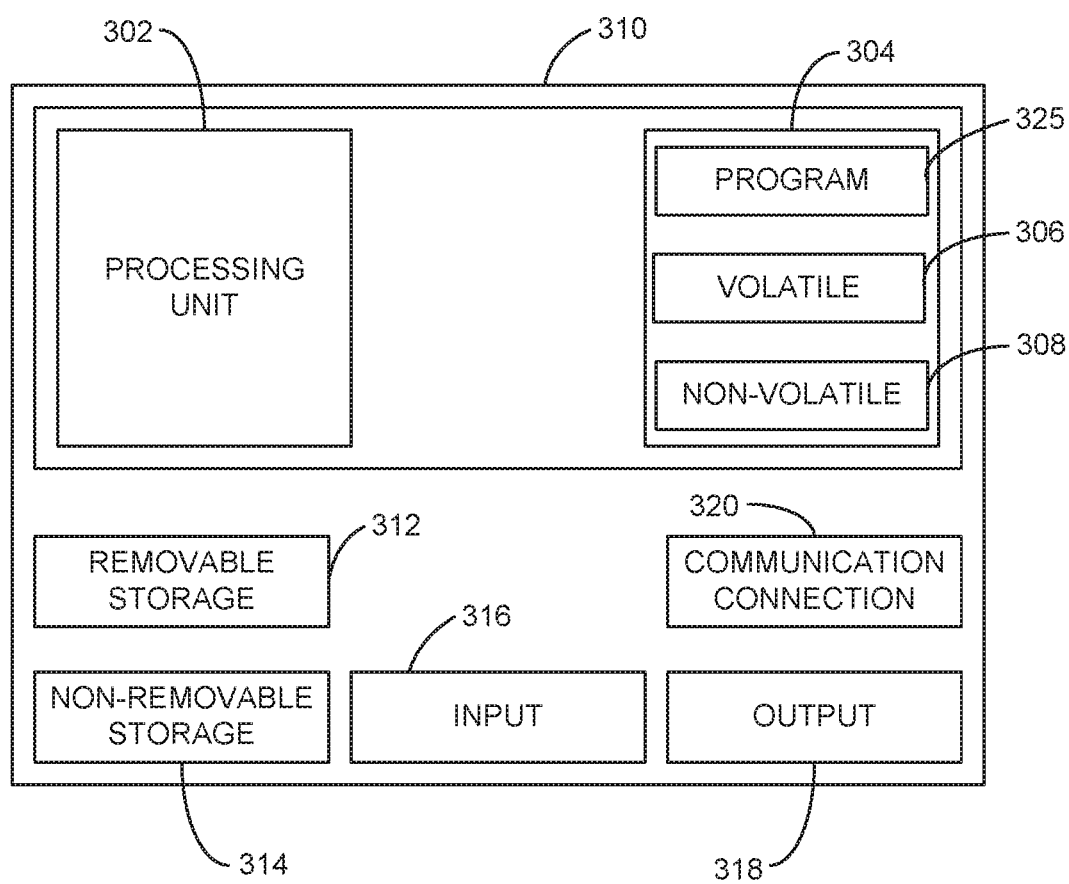
FIG. 3 is a block diagram of a computing device, according to an example embodiment.

FIG. 3 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 310, may include a processing unit 302, memory 304, removable storage 312, and non-removable storage 314. Although the example computing device is illustrated and described as computer 310, the computing device may be in different forms in different embodiments. For example, the computing device may instead be a smartphone, a tablet, smartwatch, or other computing device including the same or similar elements as illustrated and described with regard to FIG. 3. Devices such as smartphones, tablets, and smartwatches are generally collectively referred to as mobile devices. Further, although the various data storage elements are illustrated as part of the computer 310, the storage may also or alternatively include cloud-based storage accessible via a network, such as the Internet.

Returning to the computer 310, memory 304 may include volatile memory 306 and non-volatile memory 308. Computer 310 may include—or have access to a computing environment that includes a variety of computer-readable media, such as volatile memory 306 and non-volatile memory 308, removable storage 312 and non-removable storage 314. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 310 may include or have access to a computing environment that includes input 316, output 318, and a communication connection 320. The input 316 may include one or more of a touchscreen, touchpad, mouse, keyboard, camera, one or more device-specific buttons, a weight measuring device such as one or more sensors of a scale, one or more sensors integrated within or coupled via wired or wireless data connections to the computer 310, and other input devices. The output 318 may include a line display, a multi-line display, one or more indicator lights, a printer, a display device such as a monitor, and other output devices.

The computer 310 may operate in a networked environment using a communication connection 320 to connect to one or more remote computers, such as database servers, web servers, and other computing device. An example remote computer may include a personal computer (PC), server, router, network PC, a peer device or other common network node, or the like. The communication connection 320 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 320 may also or alternatively include a transceiver device, such as a BLU-ETOOTH® device that enables the computer 310 to wirelessly receive data from and transmit data to other BLU-ETOOTH® devices.

Computer-readable instructions stored on a computer-readable medium are executable by the processing unit 302 of the computer 310. A hard drive (magnetic disk or solid state), CD-ROM, and. RAM are some examples of articles including a non-transitory computer-readable medium. For example, various computer programs 325 or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   experiencing, by a first device, an unexpected device reset;
   receiving, by the first device, a first data communication;
   responding, by the first device, to the first data communication with a second data communication identifying a state of the first device as a reset state;
   receiving, by the first device in response to the second data communication, a third data communication including data to alter the state of the first device from the reset state to a programmed state;
   implementing the data of the third data communication to place the first device in the programmed state; and
   wherein the first device is not a plug-and-play device.

2. The method of claim 1, further comprising:
   receiving, by the first device, a fourth data communication including a request; and
   performing data processing to fulfill the request.

3. The method of claim 2, wherein:
   the first device is a printer;
   the request is a request to print a document; and
   the data processing performed to fulfill the request includes instructing the printer to print the document.

4. The method of claim 1, wherein the first device includes a microcontroller that defaults to the reset state when the first device is reset, the reset state causing the first device to respond to any communication with response of the second data communication identifying the state of the first device as the reset state.

5. The method of claim 1, wherein data communications are received by the first device from a host device to which the first device is communicatively coupled.

6. The method of claim 5, wherein the communicative coupling of the first device to the hose is a physical coupling.

7. The method of claim 1, wherein the first device includes a line-display.

8. A method comprising:
   experiencing, by a first device, an unexpected device reset;
   responding, by the first device, to a first data communication with a second data communication identifying a current state of the first device;
   receiving, by the first device in response to the second data communication, a third data communication including data to alter the state of the first device from the current state to a new programmed state;
   implementing the data of the third data communication to place the first device in the new programmed state; and
   wherein the first device is not a plug-and-play device.

9. The method of claim 8, wherein the current state of the first device is a state in which the first device is at least partially non-functional and the new programmed state is a reinitialized state.

10. The method of claim 9, wherein the at least partially non-functional state is a state that occurs after a fault during operation of the first device.

11. The method of claim 8, further comprising:
    receiving, by the first device, a fourth data communication including a request; and performing data processing to fulfill the request.

12. The method of claim 8, wherein data communications are received by the first device from a host device to which the first device is communicatively coupled.

13. The method of claim 12, wherein the first device includes a wireless communication device and the first, second, and third data communications are wireless data communications.

14. The method of claim 12, wherein the communicative coupling of the first device to the host is a physical coupling.

15. The method of claim 8, wherein the first device includes a line-display.

16. A non-plug-and-play couplable device comprising:
    an output device;
    a data communication device;
    a processor; and
    a memory storing instructions executable by the process to perform data processing activities comprising:
      experiencing an unexpected device reset of the couplable device;
      responding, via the data communication device, to a first data communication received via the data communication device with a second data communication identifying a current state of the couplable device;

receiving, via the data communication device in response to the second data communication, a third data communication including data to alter the state of the couplable device from the current state to a new programmed state; and implementing the data of the third data communication to place the couplable device in the new programmed state.

17. The couplable device of claim 16, wherein the output device includes at least one of a line display, a printer, and a weight measurement sensor.

18. The couplable device of claim 16, wherein the current state of the couplable device is a state in which the couplable device is at least partially non-functional and the new programmed state is a reinitialized state.

19. The couplable device of claim 18, wherein the at least partially non-functional state is a state that occurs after a fault during operation or reset of the couplable device.

20. The couplable device of claim 16, the data processing activities further comprising:

receiving, by the couplable device, a fourth data communication including a request; and performing data processing to fulfill the request.

\* \* \* \* \*